US005417064A

United States Patent [19]

Galuszka

[11] Patent Number: 5,417,064

[45] Date of Patent: May 23, 1995

[54] APPARATUS FOR SUPPLYING HYDRAULIC FLUID TO A HYDRAULIC ACTUATOR

[75] Inventor: Andrzej Galuszka, Perniö , Finland

[73] Assignee: AG Rozum Ltd. Oy, Perniö , Finland

[21] Appl. No.: 188,072

[22] Filed: Jan. 27, 1994

[30] Foreign Application Priority Data

Mar. 10, 1993 [FI] Finland .............................. 930137 U

[51] Int. Cl.[6] .............................................. F16D 31/02

[52] U.S. Cl. ........................................ 60/416; 60/413; 91/5; 91/432

[58] Field of Search ................ 91/5, 432; 60/413, 416

[56] References Cited

U.S. PATENT DOCUMENTS 3,570,244 3/1971 Strobel et al. ......................... 60/413
4,051,676 10/1977 Ledeen et al. ......................... 60/416
4,211,078 7/1980 Bass ....................................... 60/413
4,432,578 2/1984 Garlinghouse ......................... 60/413

*Primary Examiner*—F. Daniel Lopez
*Attorney, Agent, or Firm*—Shenier & O'Connor

[57] ABSTRACT

Apparatus for supplying hydraulic fluid to a hydraulic actuator, which apparatus has a delivery duct, a return duct, a pressure accumulator for the delivery duct and a hydraulic accumulator or reservoir for the return duct in which the delivery duct and the return duct are connected by way of back-pressure valves to a common single-conduit connecting line provided with a bayonet joint for disengagingly coupling the single-conduit connecting line with a twin-conduit supply circuit including a hydraulic pump and a reservoir and provided with a valve whose various positions are to be used for alternately setting each conduit of the supply circuit in a flow communication with said single-conduit connecting line.

1 Claim, 1 Drawing Sheet

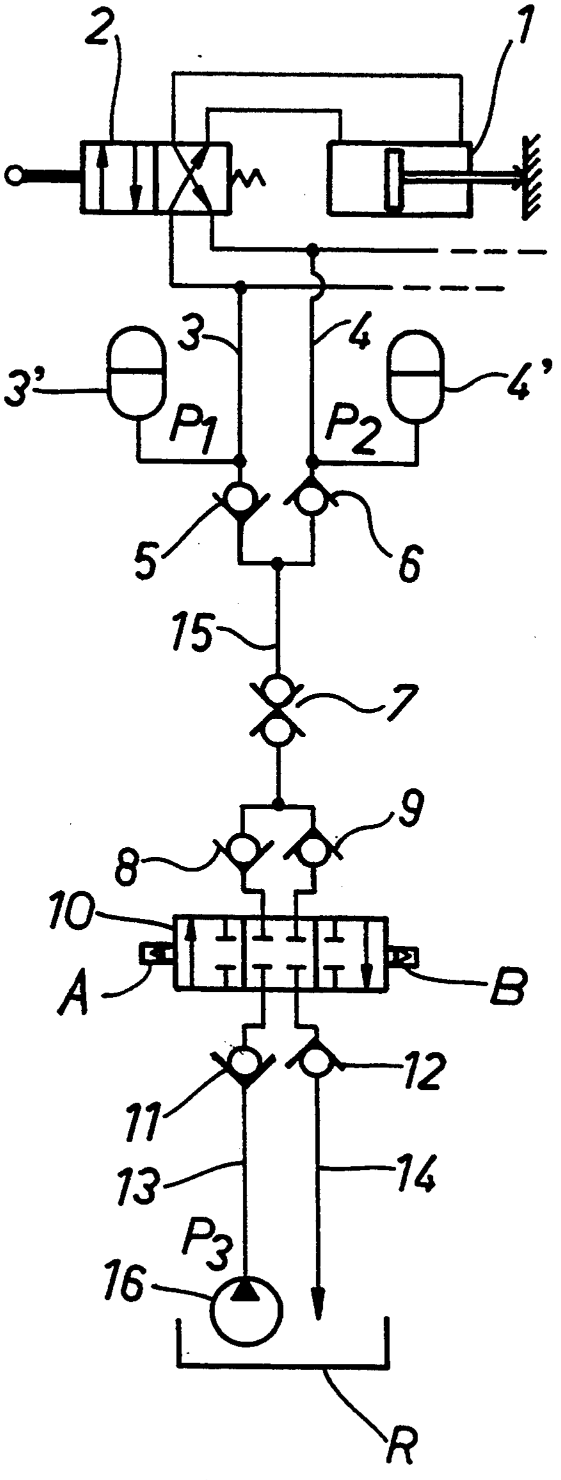
2
1
3
4
3'
4'
P1
P2
5
6
15
7
9
8
10
A
B
11
12
13
14
P3
16
R

APPARATUS FOR SUPPLYING HYDRAULIC FLUID TO A HYDRAULIC ACTUATOR

The present invention relates to an apparatus for supplying hydraulic fluid to a hydraulic actuator, comprising a delivery duct, a return duct, a pressure accumulator for the delivery duct, and a hydraulic accumulator or resevoir for the return duct.

One example of a hydraulic actuator comprises hydraulic fasteners used in a disengageable pallet for fastening the workpieces to the pallet. Thus, the supply of hydraulic fluid from a pump to an actuator cannot be permanently switched on. A pressure accumulator included in the delivery duct takes care of the supply or delivery of hydraulic fluid but, since the volume of a pressure accumulator is limited, it must be recharged from time to time while discharging a hydraulic accumulator or container included in the return duct. It is prior known that such recharging and discharging can be carried out by providing the supply circuit with a twin-conduit bayonet joint for coupling the hydraulic pump and container of an external system with the delivery duct and the return duct. However, the use of a twin-conduit bayonet joint involves several problems. With respect to turntables, for example, the pallet must be turned from time to time in view of connecting the bayonet joint for collecting the return side fluids of a hydraulic actuator in a container and for recharging the pressure side accumulator. This decelerates the speed of an entire working cycle.

An object of the invention is to provide an improved hydraulic supply requiring just a single-conduit connecting line between a supply circuit included in the actuator and an external charging circuit. Thus, in a turntable, for example, the hydraulic actuators can be permanently connected to an external supply circuit by way of the central axle. Thus, connecting portable actuators to an external supply circuit by means of a bayonet joint will be generally and essentially facilitated.

This object of the invention will be achieved in accordance with the characterizing features set forth in in the annexed claim.

The invention will now be described in more detail with reference made to the accompanying drawing, showing a circuit chart for a single-conduit hydraulic supply of the invention.

A hydraulic actuator 1 is connected by way of an operating valve 2 to a supply circuit, divided in two sections by means of a bayonet joint 7. The section of supply circuit permanently associated with the actuator 1 includes a delivery duct 3 with its pressure accumulator 3' as well as a return duct 4 with its pressure accumulator 4', whose pressure $P_2$ is substantially lower than a pressure $P_1$ in the pressure accumulator 3'. The ducts 3 and 4 are connected by way of back pressure valves 5 and 6 to a common single-conduit connecting line 15, including a bayonet joint 7 for disengageably coupling an external supply circuit with the actuaor's 1 own supply circuit.

A delivery duct 13 included in the external supply circuit is provided with a hydraulic pump 16 and a return duct 14 terminates in a reservoir R. The supply circuit 13, 14 is provided with a three-position valve 10, having an intermediate position in which both ducts 13, 14 are closed. In positions A and B of said valve 10, each duct 13, 14 is alternately set in a flow communication with the single-conduit connecting line 15.

The valve 10 is surrounded on either side by back pressure valves 8, 9 and 11, 12, which make sure that the pressure side flow always occurs in one direction and the return side flow in the other direction.

When the bayonet joint 7 is coupled and the valve 10 is in position B, the pressure accumulator 4' is able to discharge itself into the reservoir R. When the valve 10 is in position A, the pressure accumulator 3' is filled or charged until its pressure $P_1$ equals to that $P_3$ of the pump 16.

I claim:

1. An apparatus for supplying hydraulic fluid to a hydraulic actuator (1), comprising a delivery duct (3), a return duct (4), a pressure accumulator (3') for the delivery duct, and a hydraulic accumulator or resevoir (4') for the return duct, characterized in that the delivery duct (3) and the return duct (4) are connected by way of back pressure valves (5, 6) to a common single-conduit connecting line (15), provided with a bayonet joint (7) for disengageably coupling said single-conduit connecting line with a twin-conduit supply circuit (13, 14), including a hydraulic pump (16) and a reservoir (R) and provided with a valve (10), whose various positions can be used for alternately setting each conduit (13, 14) of the supply circuit in a flow communication with said single-conduit connecting line (15).

* * * * *